United States Patent [19]

Redpath

[11] Patent Number: 5,784,583

[45] Date of Patent: Jul. 21, 1998

[54] INTUITIVE TECHNIQUE FOR BUILDING GRAPHICAL MENUS

[75] Inventor: Richard J. Redpath, Cary, N.C.

[73] Assignee: International Business Machine Corp., Armonk, N.Y.

[21] Appl. No.: 709,937

[22] Filed: Sep. 9, 1996

[51] Int. Cl.$^6$ .................................................. G06F 3/00
[52] U.S. Cl. ..................................................... 395/353
[58] Field of Search ....................................... 395/352, 353

[56] References Cited

U.S. PATENT DOCUMENTS

| | | | |
|---|---|---|---|
| 4,821,211 | 4/1989 | Torres | 395/352 |
| 5,041,967 | 8/1991 | Ephrath et al. | 395/352 |
| 5,398,312 | 3/1995 | Hoffmann | 395/156 |
| 5,420,975 | 5/1995 | Blades et al. | 395/352 X |
| 5,463,727 | 10/1995 | Wiggins et al. | 395/353 |
| 5,530,796 | 6/1996 | Wang | 395/352 |

OTHER PUBLICATIONS

"New For PC: Galacticomm Intros The Major BBS 6.0," Newsbytes News Network, 1992.

*Primary Examiner*—Mark R. Powell
*Assistant Examiner*—A. Katbab
*Attorney, Agent, or Firm*—Gregory M. Doudnikoff

[57] ABSTRACT

A technique for permitting the intuitive creation of menus for utilization in graphical user interfaces is disclosed. Menus are created through a visual programming technique by utilizing a visual menu builder tool which enables a developer to create a representation of a menu in the form of a tree comprising nodes and interconnecting edges.

10 Claims, 10 Drawing Sheets

INTUITIVE TECHNIQUE FOR BUILDING GRAPHICAL MENUS

BACKGROUND OF THE INVENTION

1. Field of the Invention

The present invention relates to a technique for permitting software developers to intuitively create menus for graphical user interfaces. More particularly, the present invention relates to a technique by which menus can be created utilizing a visual model and viewed during development without requiring developers to write code or compile the menu code into an application to view the menu graphically.

2. Description of the Related Art

The use of menus is practically universal in graphical user interfaces for software applications. Menus are utilized to provide end users of applications with available choices or processing options while using applications. For example, in the WebExplorer Internet browser from International Business Machines Corporation (IBM), selection of "file" from the menu bar causes a context menu which provides "file" options to be displayed. Some of the file options have additional subordinate or child options associated therewith. Upon selection of one of these options, the child options are displayed in context in a child menu or submenu proximate to the selected parent option. One or more of the child options provided in the child menu may have subordinate options. Thus, such a menu system comprises cascading sets of menus which are displayable in context illustrating the parent/child relationships between options of the context menu.

While context menus have been adopted nearly universally because of their ease of use for end users, context menus remain difficult for software developers to create. One of the primary techniques by which context menus are created today is through the use of a resource file having a context menu embedded therein as data. Resources are one type of data which is included in computer programs. Resources do not reside in a program's normal data segment, but rather are contained in resource files which are maintained and treated separately from other data in a computer program. For example, when the Windows operating system loads programs into memory for execution, such as programs written in the C or C++ programming languages, the operating system usually leaves resources on the disk. Typically, only when the operating system needs a particular resource during execution of a computer program does the operating system actually load the resource into memory.

Standard resource files comprise text files which include different types of data, such as menu data, bitmap data, audio data, etc. Each type of data is associated with a keyword, such as "MENU", with the data written in a prescribed format which has been defined relative to the keyword. A resource file is typically written with a text editor, and the developer must know the precise formats relative to each keyword. Resource files are compiled with the application in which it is needed. Typically, resource data can only be reviewed graphically in the compiled application during execution. Thus, a minor format problem introduced by the developer into the format while writing a resource file for a menu may not be discovered until much later.

A second primary technique by which menus are currently created is by the utilization of application programming interfaces (API's) by a developer. Once again, this technique involves writing code to call a menu API directly. The developer must know the format and APIs. The written code must be compiled and executed before the menu being created can be visually inspected for errors.

Accordingly, a need exists for a technique for creating menus which is intuitive, does not require knowledge of a precise format or language, and permits visual inspection of the resulting menu prior to compiling and executing an application which includes the menu.

SUMMARY OF THE INVENTION

An object of the present invention is to provide a technique for permitting the intuitive creation of menus for software applications.

Another object of the invention is to provide a technique for reviewing menus graphically prior to the compiling and execution of a program including the menus.

Yet another object of the invention is to provide a visual system for creating menus for which no knowledge of keyword formats or menu APIs is required.

Other objects and advantages of the present invention will be set forth in part in the description and the drawings which follow, and, in part, will be obvious from the description or may be learned by practice of the invention.

The present invention will now be described with reference to the following drawings, in which like reference numbers denote the same element throughout.

DESCRIPTION OF THE PREFERRED EMBODIMENT

Figure 1:
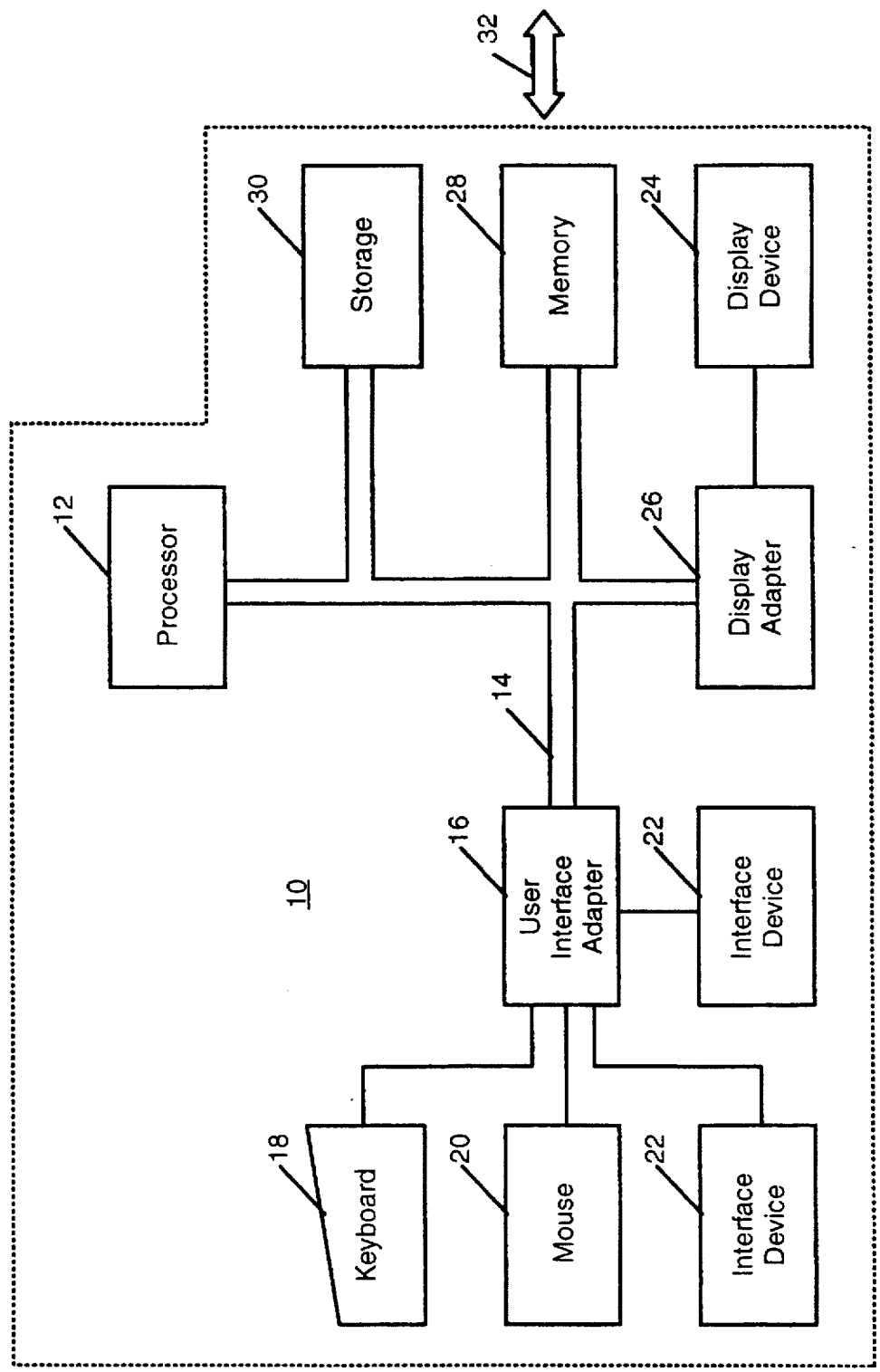
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and permanent storage 30 which can include a hard drive, tape drive, etc.

The workstation 10 communicates via a communications channel 32 with other computers or networks of computers. The workstation 10 may be associated with such other computers in a local area network (LAN) or a wide are network, or the workstation 10 can be client in a client/ server arrangement with another computer, etc. All of these configurations, as well as the appropriate communications hardware and software, are known in the art.

Figure 2:
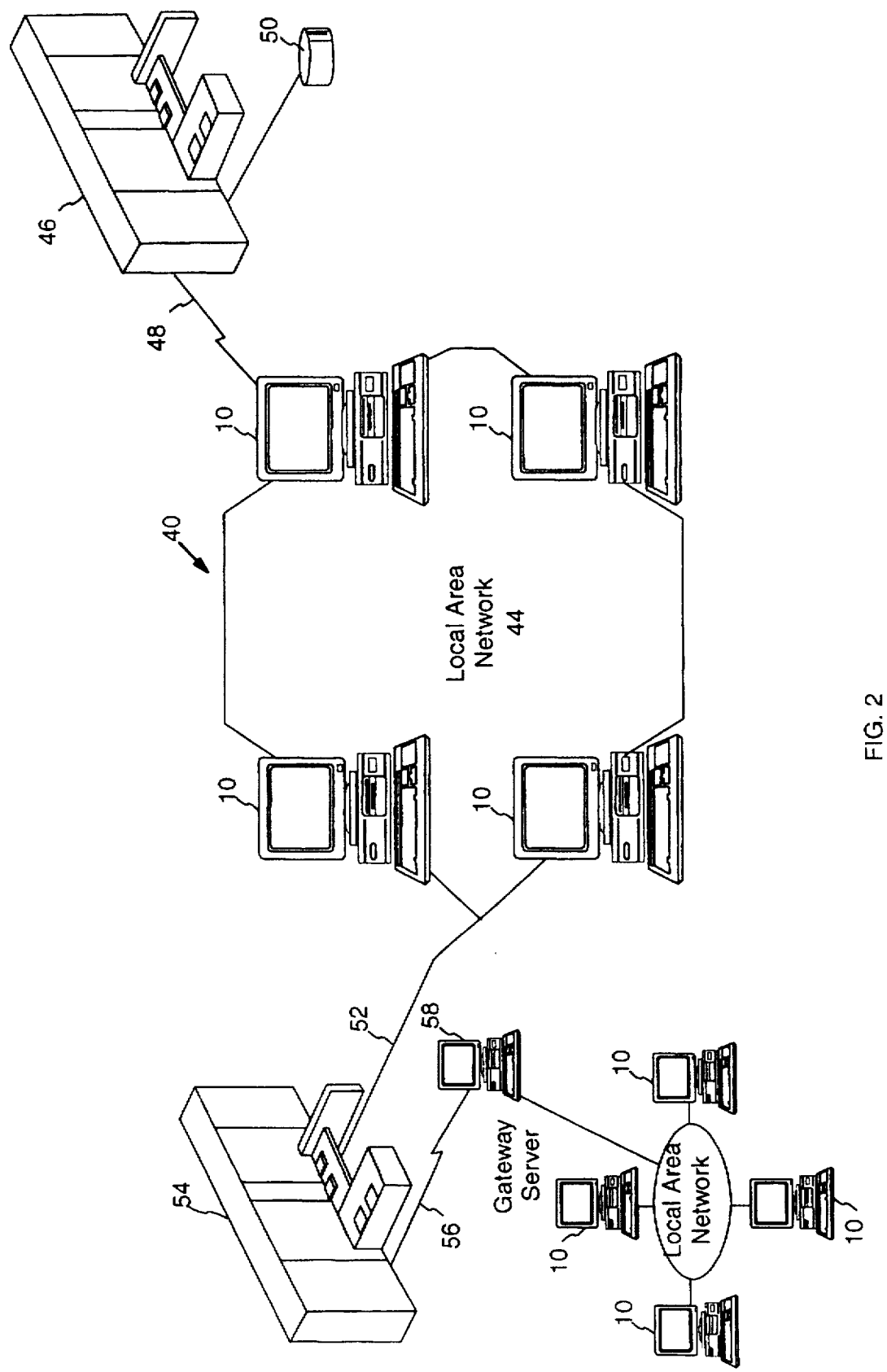
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" and "Enterprise Systems Architecture/390" are trademarks of IBM; "Applications System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 8.

In the preferred embodiment, the present invention is implemented in the Java language. Object oriented languages, such as Java, Smalltalk and C++, typically include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object orienting programming techniques, are well known to those skilled in the art, and will not be discussed in depth herein. While the present invention will be described in terms of a technique for creating menus with a tool written with the Java programming language, the present invention may be implemented in other programming languages.

Figure 3:
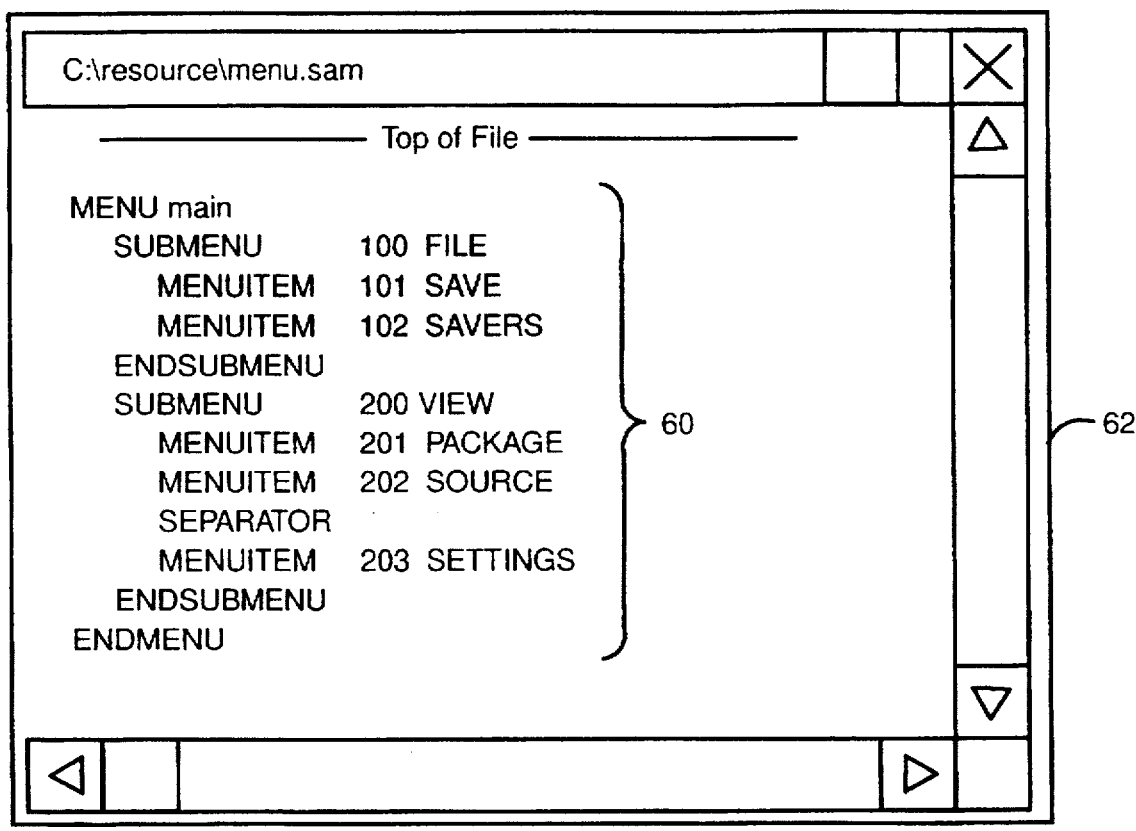
FIG. 3 illustrates a standard resource file comprising data for a menu.

A standard prior art text resource file consisting of menu data 60 as displayed in a window 62 on a display device is illustrated in FIG. 3. In this context, a developer cannot tell easily whether formatting errors have been included in the menu data 60 and certainly is unable to inspect visually what the actual menu will look like when displayed to an end user within an application. Before visual inspection can occur, the resource file must be compiled into the application and the application executed. This requirement is both expensive and time consuming, as visual inspection cannot occur until after computer resources have been extensively utilized (compile and execute). Many iterations may be required, as well as extensive amounts of developer time.

Figure 4:
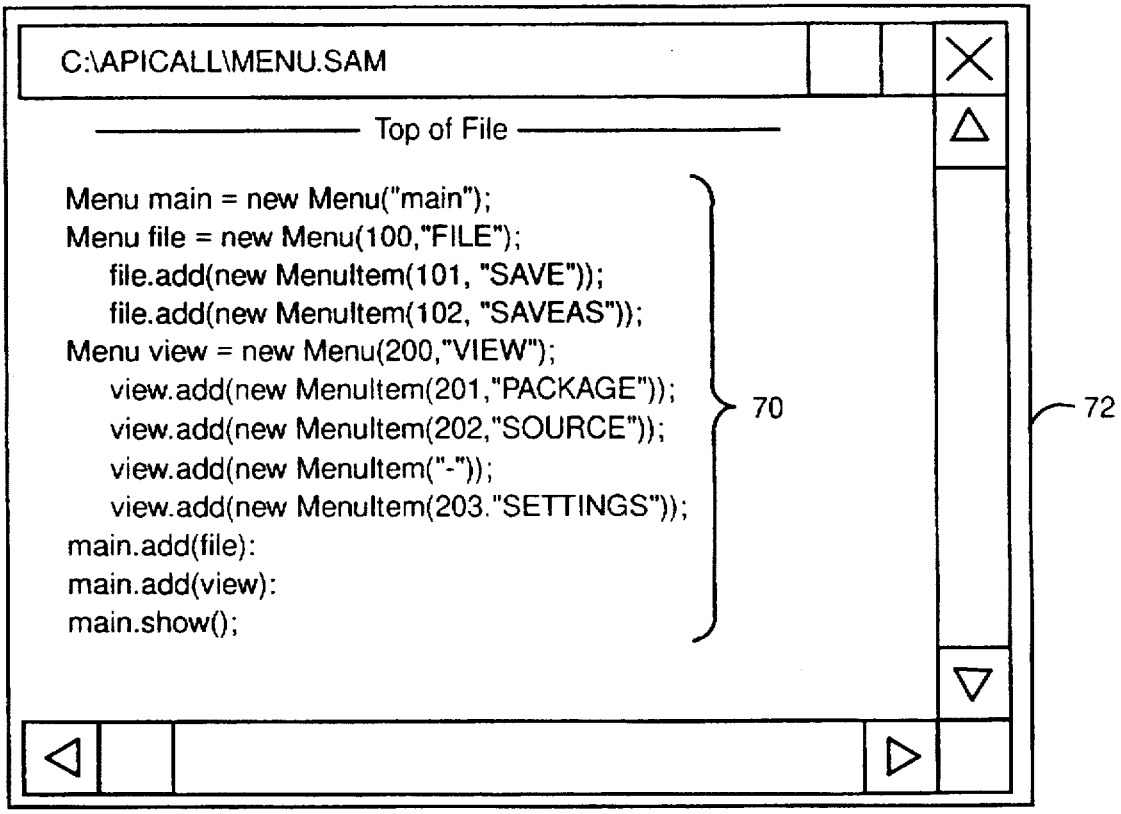
FIG. 4 illustrates a file comprising code written to call a menu API directly.

A file 70 which directly calls menu APIs is illustrated in a window 72 in FIG. 4. Once again, creating menus via this technique does not provide the developer with the ability to inspect the actual resulting menu. The file 70 is format intensive and errors included therein are not easy to discover. Typically, the menu which is represented by the file 70 can only be viewed after the application in which the file 70 is included is compiled and executed. Thus, the same problems that are associated with the resource file technique are associated with the menu API file technique.

The present invention provides a visual technique via a visual menu builder tool for creating a resource file which includes a menu. The resulting menu is visually inspectable prior to compiling the resource file in an application. Additionally, the developer needs to know nothing about the keyword data format for creating a text resource file for a menu. The visual building technique automatically converts the resulting Java language visual format menu resource file into a standard text format resource file using a conversion routine which is included in the visual menu builder tool. The converted standard text format resource file may then be utilized by software applications written in a variety of languages, in accordance with known techniques.

Preferably, the visual menu building technique of the present invention is employed within a visual resource file builder tool, although the technique may be employed in a standalone tool intended solely for building menus. Such a standalone tool would include a subset of the functions of a more generalized visual resource file builder tool. Such a visual resource file builder tool is the subject of copending U.S. patent application Ser. No. 08/701,226 filed on Aug. 21, 1996, which has the same inventor and is assigned to the same Assignee as the present application.

Figure 5:
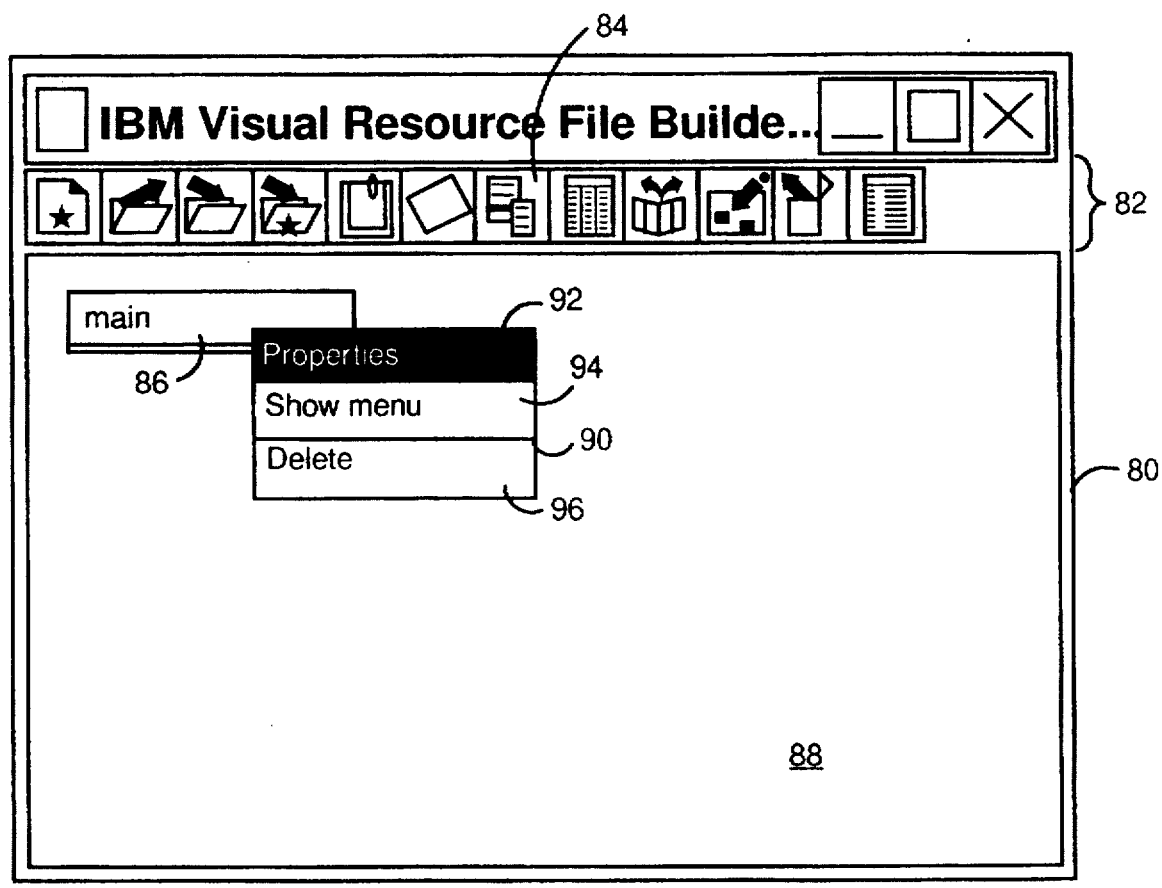
FIG. 5 illustrates a menu object included within the work area of a visual resource file builder tool.

A graphical user interface 80 for a visual resource file builder tool written in the Java programming language in accordance with the present invention is illustrated in FIG. 5. The graphical user interface 80 includes a tool bar 82 which includes a selectable iconic representation which corresponds to a set of Java classes for visually creating a menu.

The Java classes provide what is essentially a set of shells for any menu that can be created using the visual resource file builder. Instances of the Java classes, also known as objects, are created when the developer adds menu-related elements. Each instance is populated with instance data pertinent to the instance. The process described below relative to the flowchart of FIG. 6 describes the creation of a logical menu by creating objects from the classes and adding instance data, and then creating a displayable menu from the logical menu by assembling instances of Java classes which represent visual components of a menu.

Figure 7:
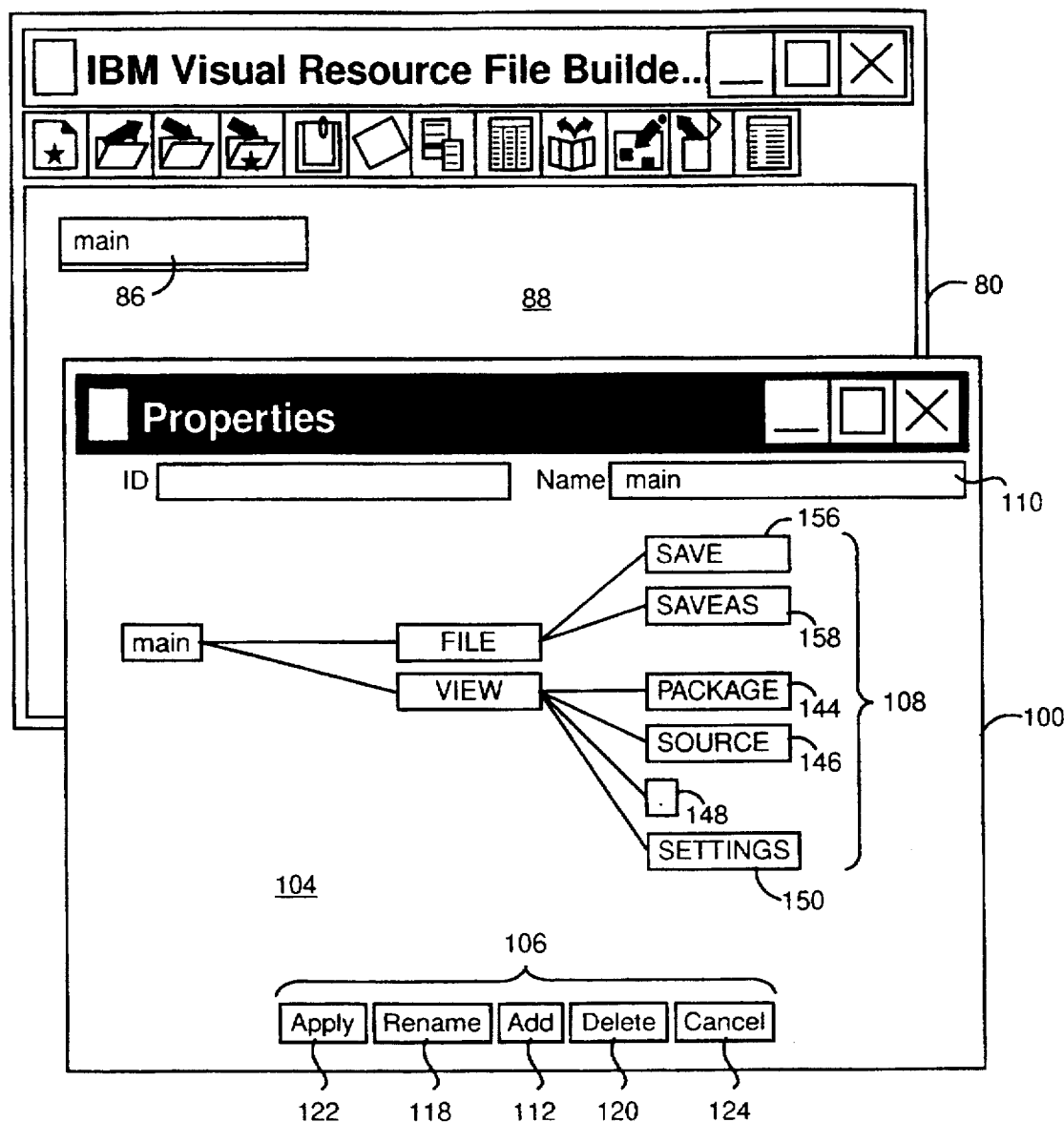
FIG. 7 illustrates the menu building window including a menu tree through which a menu is created in accordance with the present invention.

As per Step 100, a developer begins creation of a new menu by selecting the menu icon 84 from the tool bar 82 of the visual resource builder tool. As illustrated in FIG. 7, this causes a menu builder window 100 having only an unlabelled root node 102 included in its work area 104 to be displayed. The root node 102 is "active", in that any action taken within the menu builder window 100 with respect to the menu under construction will be performed relative to the root node 102. Actions may be performed via a set of buttons 106 provided within the menu builder window 100. Preferably, the root node 102 is also highlighted or otherwise visually accented to let the developer know that the root node 102 is the active node (Step 102).

Alternatively, after a menu has been created utilizing the menu builder window 100, a visual representation 86 is displayed within a work area 88 of the GUI 80 of the visual resource file builder too. Upon selection of the visual representation 86, such as by clicking a mouse button while the mouse cursor is over the visual representation 86, an options menu 90 (FIG. 5) for the previously created menu is displayed. Selection of a "properties" option 92 within the options menu 90 (Step 104) causes the previously created menu tree for the menu, such as a menu tree 108 in the work area 104 of the menu builder window 100, to be displayed (Step 106). One of the nodes within the menu tree is then highlighted, such as the root node 102, to indicate that it is the active node.

Using and displaying trees comprising nodes and interconnecting edges to convey relationship information is known, so details about creating nodes and edges are not discussed in detail herein. Trees typically comprised a plurality of nodes interconnected by edges. Utilization of trees to the construction of context menus provides a greatly enhanced technique for conveying to the developer the interrelationship between menu items within a context menu being developed. The relationship of each menu item to each other within the menu is immediately understood. The technique for utilizing the menu builder to create a menu will now be discussed with emphasis on the development process illustrated in the flowchart of FIG. 6. The basic development options are provided by the set of buttons 106 in the menu builder window 100 of FIG. 7, and are substantially the same for both a new menu tree and an existing menu tree. The buttons correspond to the options illustrated in the flowchart of FIG. 6 in Steps 112, 116, 120, 124 and 128.

According to the preferred embodiment, as the nodes and edges are created for the menu tree (the logical menu), they are provided with numbers for use in the construction of a visual menu corresponding to the logical menu. A visual menu is created so that a developer may review what the menu will look like prior to inclusion of the resource file in an application and then compiling and executing the application. Construction of the visual menu is not required, as a logical menu comprising the Java objects is converted into a standard text format resource file which may be utilized by applications written in a variety of programming languages, in accordance with known techniques.

Upon initial selection of the menu icon 84 from the tool bar 82, the root node 102 upon creation is designated as node "0". At any time during the development of the menu via the menu builder window 100, the developer may enter or modify a name for the root node 102 by entering a new name or modifying a name already entered in a "name" text entry field 110. When the modifications or additions to the menu builder window 100 are "applied", the root node name from the name text entry field 110 is displayed within the root node 102 and within the visual representation 86 of the menu within the work area 88 of the visual resource file builder. The root node 102 is not actually part of the menu structure itself that will be displayed to an end user of an application. The root node 102 does mirror the selection mechanism for displaying the menu in an application in which it is included. For example, selection of the "file" option from a menu bar in a typical application causes a menu to be displayed which corresponds to the file option. Similarly, selection of other buttons within an application may cause a menu to be displayed. Nodes which are directly connected to the root node 102 via edges logically comprise the panes within the first tier menu, which, upon selection of the menu for display such as by selection of the file option in a menu bar, is displayed to a user of the application.

Preferably, upon opening of the menu builder window 100, one of the nodes in the displayed menu tree 108 is highlighted. Visual highlighting of one of the nodes indicates that node is "selected". The options provided by the set of buttons 106 are directed to whichever node is selected at the time a button is selected. As per Step 108, the developer causes a different node to become "selected" by, for example, clicking on it with a mouse. The newly selected node is highlighted (Step 110), and the developer may then affect processing relative to the newly highlighted node.

When the developer selects an "add" button 112 from the set of buttons 106 when the root node 102 is highlighted (Step 112), an instance of an edge class and a node class are created and a new edge and new node, such as a node 114 and edge 115, are graphically displayed within the work area 104 as part of the menu tree 108. The new node 114 is a child node to the root node 102. The new edge 115 connects the root node 102 and the new node 114. The new node 114 is unlabeled at this time, but has equal standing with all of the other child nodes, if any, that have been created relative to its parent node. In FIG. 7, the node 114 and a node 116 are child nodes to the root node 102, and each is individually created in the manner described above. The only difference is that the node 114 was created prior to the node 116. This is visually detectable, as it is displayed above node 116. In the resulting visual menu, the pane corresponding to the node 114 will be displayed above the pane corresponding to the node 116 in a first tier menu, or within a menu bar as a selectable option for an end user, depending upon how the menu is integrated into an application.

Upon creation of a child node, the node is numbered with the next sequential available node number. In the case of the node 114, which is the next sequential node following the root node 102, the number will be number "1". The edge connecting the parent and child nodes is given the next available sequential edge number. The edge number sequence also begins with "0". Thus, the edge will receive an edge number equal to the number of its "to" node (the child node) less one. The new node is then highlighted so that processing can continue relative to the newly created node (Step 114).

Upon creation of each node object and edge object, instance data is provided for the objects. For each edge object created, this information includes the node number for its "from" node (parent node) and its "to" node (the child node with which it was created). For each node object, this information includes its node number. Instance data is modified or new instance data is added for the objects as development continues.

For all of the nodes except for the root node 102, a "rename" button 118 may be selected (Step 116) in order to provide a new label for the selected node or modify previously supplied label (Step 118). The label is displayed to end users in the menu pane which corresponds to the node in applications which employ the menu.

A delete option is available relative to all of the nodes (except for the root node 102) by selection of a "delete" button 120 (Step 120). Upon selection of the delete button, the selected node is removed from the menu tree 108, as are any nodes which are direct descendants of the selected node (any child nodes, their children, etc.). All of the edges that were originally created when the deleted nodes were originally created are also deleted. The node and edge numbers relative to the entire menu tree 108 are also modified to reflect the deletion of the node(s). For example, if node numbers 0–8 previously existed and nodes 4–6 are deleted, nodes 7 and 8 are renumbered as nodes 4 and 5. Their corresponding edges are renumbered as edges 3 and 4 in accordance with the edge numbering scheme. The parent node for the deleted node is then highlighted (Step 122).

Upon selection of an "apply" button 122 (Step 124), the modifications or additions made to the menu, such as through utilization of the add, rename and delete buttons in Steps 112, 116 and 120, are saved over any prior saved file for this menu (Step 126). Until the apply button 122 is selected, changes made to the menu are not permanently saved. For example, upon selection of the apply button, objects corresponding to deleted nodes and end edges are deleted from the logical menu, and the instance data for the node and edge numbers for the remaining node and edge objects are updated as appropriate. Following selection of the apply button, a visual menu is constructed. The construction process is discussed later relative to Steps 140 et al.

If the developer selects a "cancel" button 124 (Step 128), any modifications or additions to the menu made by the developer since the last selection of the apply button 122 are deleted (Step 130) and the menu tree as of the last selection of the apply button 122 by the developer, if any, is displayed within the menu builder window 100 (Step 132). When the developer finally closes the menu builder window 100 through normal means (Step 134), processing relative to the menu is ended and any modifications or additions not saved via the apply option are not saved. If the menu was being worked on for the first time, the visual representation 86 corresponding to the menu is created and displayed within the work area 88 of the GUI 80 for the resource file builder tool (Step 136). Processing then returns to the visual resource file builder tool, and the developer may begin processing a new menu via Step 100, reopen an existing menu via Step 104, or close the builder tool (Step 138) to end development.

Figure 8:
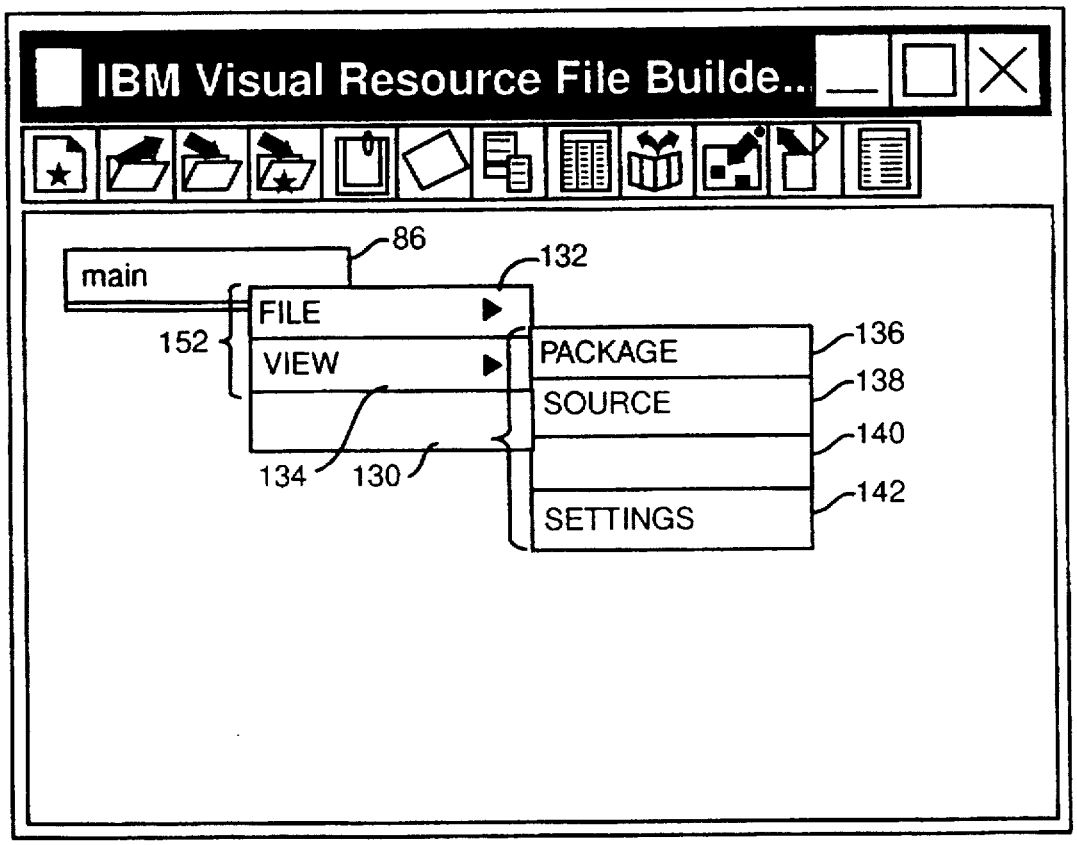
FIG. 8 illustrates the menu being created by the visual menu builder during the creation process.

The developer may view the actual menu created using the menu builder tool by selecting a "show menu" option 94 provided in the options menu 90 (FIG. 5), which is displayed upon selection of the visual representation 86 by the developer. By selecting the show menu option 94 from the options menu 90, a visual menu corresponding to the menu under development is displayed in the form it would be displayed to end users. The visual menu is constructed and saved upon selection of the apply button 122. FIG. 8 illustrates such a constructed menu 130. Menu panes 132, 134 correspond to nodes 114, 116 from the menu tree 108 of FIG. 7, while second tier (submenu) menu panes 136, 138, 140, 142 correspond to nodes 144, 146, 148, 150 from the menu tree 108. The constructed menu 130 is active, such that selection of the pane 134 from the first tier menu 152, which includes a visual representation that a submenu exists, causes the submenu 154 to be displayed. Similarly, selection of the pane 132 would cause a submenu having panes corresponding to nodes 156, 158 from the menu tree 108 to be displayed. The techniques for providing visual representations for submenus in parent menu panes are known in the art, as are techniques for displaying submenus upon selection of parent menus, and will not be further discussed herein.

Figure 6A:
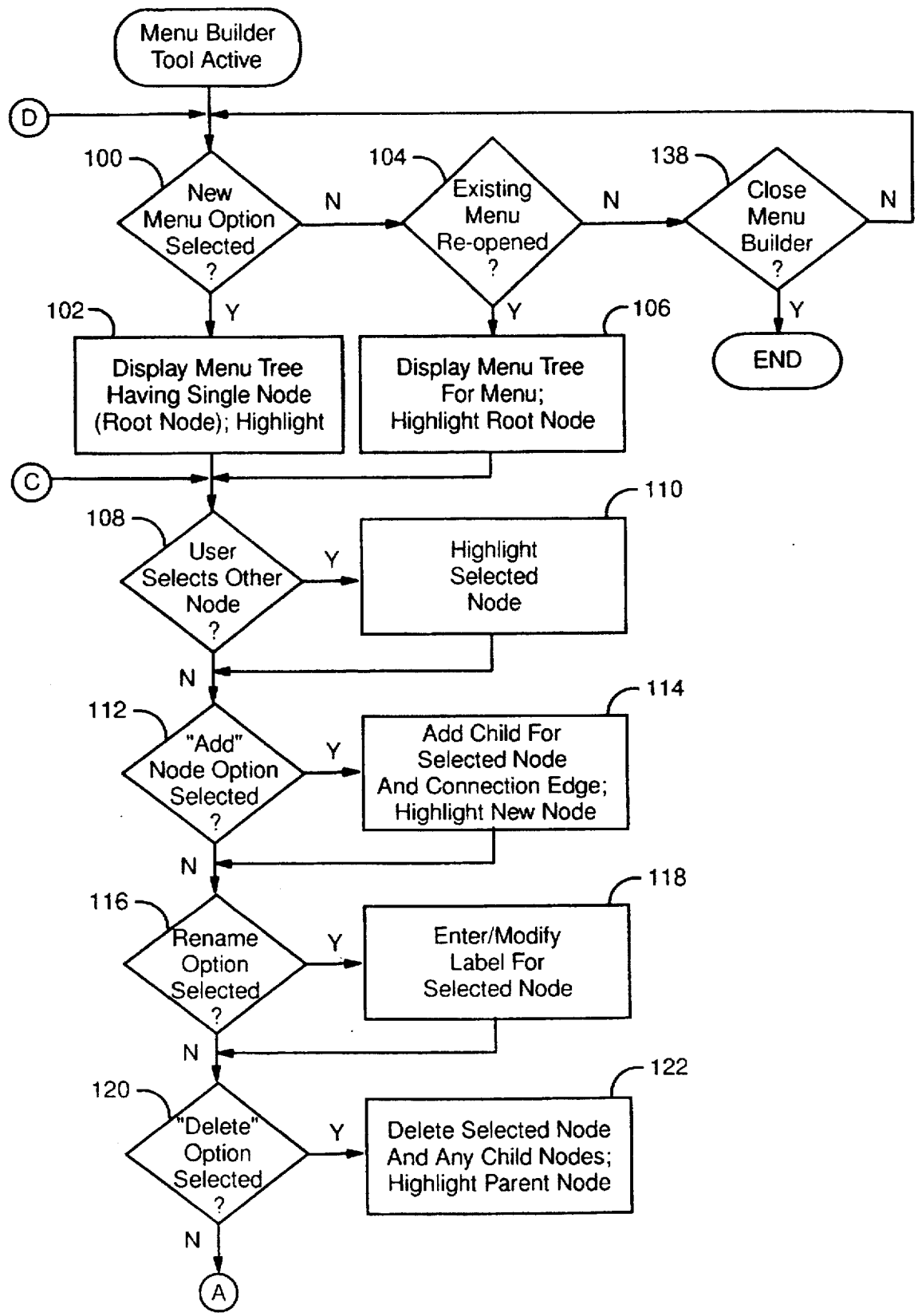
FIG. 6A-6C illustrate a flowchart of the logical steps for creating a menu in accordance with the present invention.
Figure 6B:
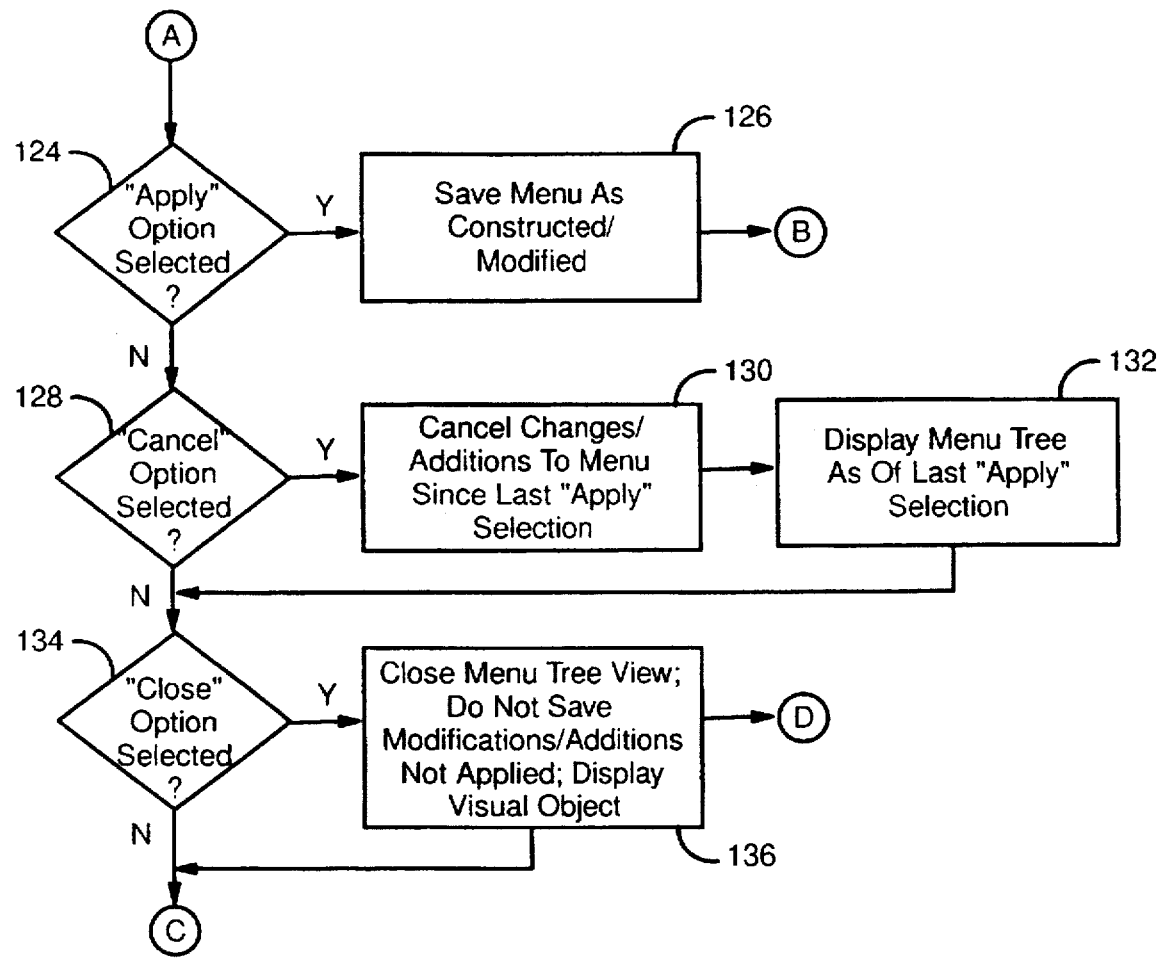
Figure 6C:
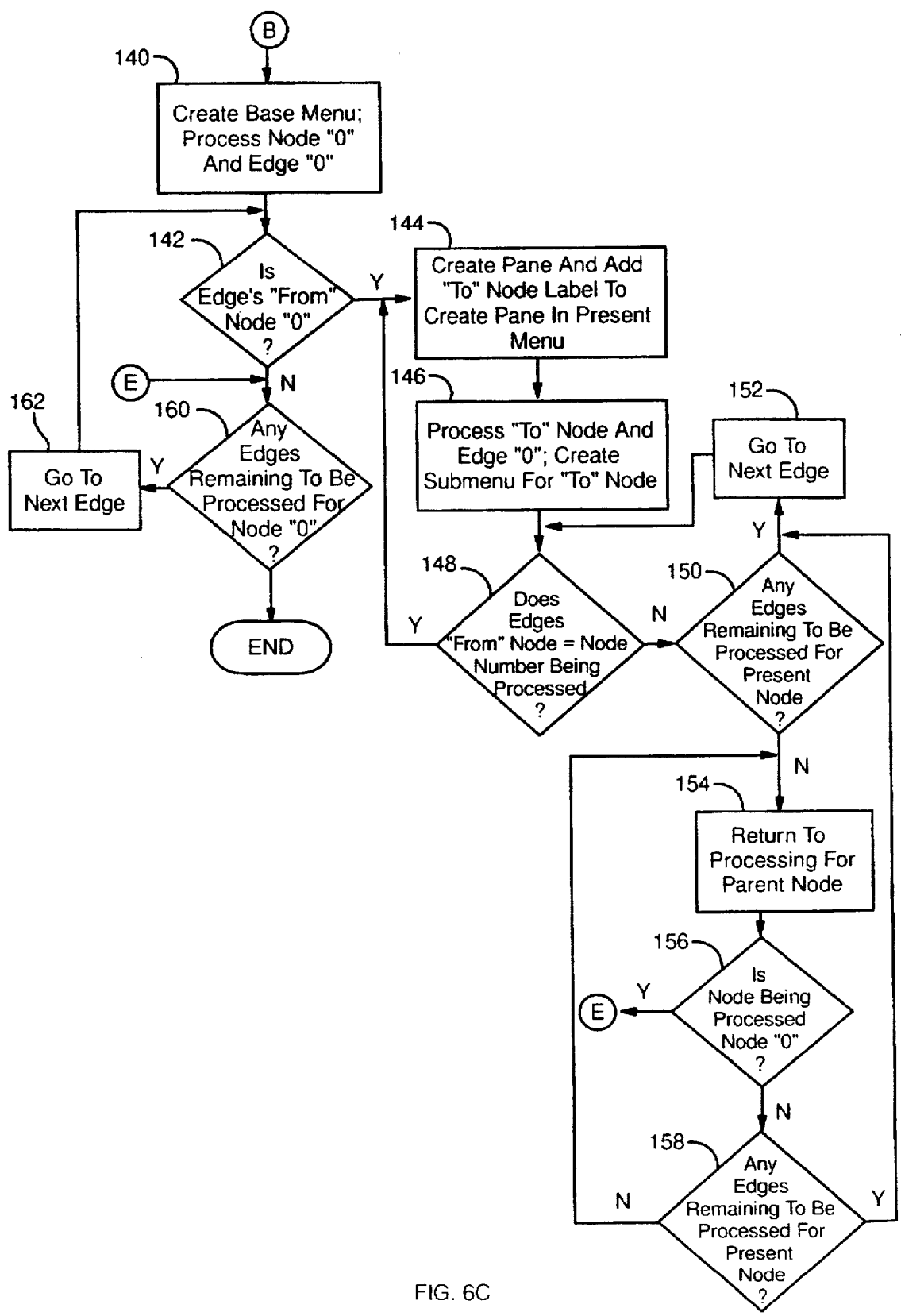

The process for creating a visual menu upon selection of the apply option will now be described with reference to FIG. 6C. Following the saving of the logical menu in step 126, construction of code for a visual context menu representative of the logical menu is performed. While a context menu which is created through this process, the first tier menu displayed may actually be utilized as a menu bar in an application in which the being displayed is utilized. This option is carried out in accordance with known techniques by the developer who embeds the menu into an application.

First, an empty base menu relative to the root node (node 0) is logically created. The data which will fill this menu will be from the node objects which are the direct children of the root node object from the menu tree. Initially, this base menu is active, and processing is carried out relative to the root node and edge 0 (Step 140). Relative to edge 0 in any menu tree, the "from" node will always be node 0. In Step 142, the "from" node for the edge being processed is determined. In cases where the from node is determined to be node 0 (Step 142), processing proceeds to Step 144. A pane is created in the active menu for the "to" node relative to the edge being processed, and the node name for the "to" node is placed in the created pane. Next, the "to" node for the active edge (the edge being processed) is made the active node (or node being processed). A submenu is logically created for the "to" node and it becomes the active menu. The 0 edge is made the active edge (Step 146). Once again, a determination is made as to whether the "from" node for the active edge is equal to the now active node (Step 148). For the edge 0, the answer here will always be no, since the active node cannot be the 0 node and the "from" node for the 0 edge is node 0. In this case, processing proceeds to Step 150, in which it is determined whether any edges have not been processed relative to the active node (Step 150).

When the active edge is edge 0, the answer will usually be yes, and processing proceeds to Step 152, in which the next sequential edge (edge 1) is made to be the active edge. Processing then returns to Step 148 to determine if the "from" node for the newly active edge is the same as the node number for the active node. If the active node has no child nodes in the menu tree, then the determination in Step 148 will always be no relative to all of the edge objects which correspond to edges in the menu tree. Finally, when it is determined in Step 150 that the last edge has been processed, processing proceeds to Step 154, in which processing is returned to the parent node; that is, the parent node for the active node is made to be the active node. This permits processing to be completed relative to the parent node, since processing was interrupted relative to the parent node in either Step 142 or 148. If the now active node is determined to be any node other than node 0 in Step 156, processing proceeds to Step 158, and it is determined whether any edges have not been processed relative to the now active node (Step 158). If edges are found to remain to be processed for the now active node in Step 158, processing jumps to Step 152, and the next sequential edge which has not been processed relative to the active node becomes the active edge, and processing then proceeds to Step 148.

When in Step 148 it is finally found that the "from" node for the active edge equals the node number for the node being processed, processing jumps to Step 144, and a new pane is created in the active menu and the name of the "to" node is added to the pane. The "to" node becomes the active node, the edge 0 becomes the active edge, and an empty submenu is created for the "to" node (Step 146).

The recursive processing described relative to Steps 144–158 continues until finally it is determined in Step 156 that all of the nodes that are descended from the node which is the "to" node from edge 0 (node 1) has been completed. That is, relative to each child node for the route node, processing is performed relative to all of the descending nodes and all appropriate submenus are created before processing jumps from Step 156 to Step 160 so that all of the remaining edges can be checked to determine if they connect child nodes to the root node.

Referring to FIG. 7, node 114 is first added to a base menu as a pane therein and then a submenu is created and nodes 156 and 156 are added as panes in the submenu. While logical submenus are created relative to nodes 156 and 158, since neither node has a child node, these submenus remain empty and nothing will be displayed. The node 156 will first be added into the submenu for the node 114, and then when it is determined that the node 156 has no child nodes by checking through all of the edges, processing will return to the node 114 for any unprocessed edges. The node 158 will then be found to be a child node to node 114 and added to the submenu for the node 114. After all the edges have been checked and determined that no child nodes exist for the node 158, processing will again return relative to the node 114, and when it is determined that no additional nodes are child nodes to node 114 in Step 156, processing will once again return to the unprocessed edges relative to the root node 102.

After it is determined in Step 156 that the node now being processed is node 0 and it is then determined in Step 160 that edges have not been processed relative to node 0, the next sequential edge becomes the active edge (Step 162) and it is determined in Step 142 whether the now active edge connects the root node to a child node.

Relative to FIG. 7, when the active edge connects the root node 102 to its child node 116, the process relative to Steps 144–158 will be carried out relative to the nodes 116, 144, 146, 148, 150 in the manner described above.

In the preferred embodiment, this process is carried out using a technique known as open coded recursion. Open coded recursion is supported by a number of advance programming languages, such as Java.

Following the creation of the code for a visual representation of the logical menu, selection of the show menu option 94 from the options menu 90 causes the created menu to be displayed, as illustrated in FIG. 8.

Additionally, at some time the logical menu which comprises Java objects needs to be converted into a standard text format which is compatible with standard resource files. Such a standard resource file is illustrated in FIG. 3. This conversion process is relatively straight forward, and is performed by appropriate querying of the instance data of the Java objects which comprise the logical menu to determine which objects correspond to which menu items to determine the hierarchy menu, upon which the text format is based. This information is combined with standard text file formatting terminology, to create a text format resource file for a menu.

While the present invention has been described for visually creating menus using a Java language tool, the basic techniques described herein may be applied in other programming languages. Thus, while the preferred embodiment of the present invention has been described, additional variations and modifications in that embodiment may occur to those skilled in the art once they learn of the basic inventive concepts. Therefore, it is intended that the appended claim shall be construed to include both the preferred embodiment and all such variations and such modifications as fall within the spirit and scope of the invention.

I claim:

1. In a computing environment, a tool for creating menus for use in graphical user interfaces comprising computer readable code, said tool comprising:

a class library comprising classes corresponding to edges and nodes;

first subprocesses for permitting a developer to visually build a representation of a menu by creating a tree comprising instances of node classes and edge classes; and second subprocesses for converting the tree into a standard text format for use in an application.

2. A tool according to claim 1, further comprising:

third subprocesses for creating a visual menu for display during development from the tree.

3. In a computing environment, a system for creating a menu for a graphical user interface, comprising:

a class library including classes corresponding to edges and nodes for use in a node tree;

means for creating a node tree representing a menu with node objects and edge objects from said class library; and means for converting the node tree into a format for a menu utilizable by a software application.

4. A system according to claim 3, further comprising:

means for constructing and displaying a visual menu during development from the objects comprising the node tree.

5. A method for graphically creating a menu for use in a software application by building a menu tree representative of the menu being created, comprising the steps of:

creating a first tier for the menu by adding first tree nodes, each of the first tree nodes corresponding to a pane of the first tier of the menu;

creating submenus for one or more of the panes of the first tier, if desired, by adding submenu tree nodes and edges connecting each of the submenu tree nodes to its parent tree node among the first tree nodes, each of the submenu tree nodes corresponding to a pane of the submenu for its parent tree node; and converting the built menu tree into a menu format utilizable by a software application.

6. A method for graphically creating a menu according to claim 5, wherein said creating a first tier step further comprises adding the first tree nodes and edges connecting each of the first tree nodes to a root node.

7. A method for graphically creating a menu according to claim 5, further comprising the step of:

creating additional submenus for one or more of the panes of the already created submenus, if desired, by adding additional tree nodes and edges connecting each of the additional tree nodes to its parent tree node among the submenu tree nodes, each of the additional tree nodes corresponding to a pane of the additional submenu for its parent tree node.

8. A method for graphically creating a menu according to claim 6, wherein the first tree nodes and the edges are instances of classes corresponding to the first tree nodes and the edges.

9. A method for graphically creating a menu according to claim 5, further comprising the step of:

displaying, if requested, the menu being created at a present level of creation of the menu tree.

10. A method for graphically creating a menu according to claim 5, wherein said creating steps further comprise providing labels for each of the first tree nodes and submenu tree nodes.

* * * * *